United States Patent
Dybesetter et al.

(10) Patent No.: US 7,657,186 B2
(45) Date of Patent: *Feb. 2, 2010

(54) CONSISTENCY CHECKING OVER INTERNAL INFORMATION IN AN OPTICAL TRANSCEIVER

(75) Inventors: Gerald L. Dybesetter, Scotts Valley, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 439 days.

This patent is subject to a terminal disclaimer.

(21) Appl. No.: 11/073,886

(22) Filed: Mar. 7, 2005

(65) Prior Publication Data
US 2005/0196171 A1 Sep. 8, 2005

Related U.S. Application Data

(60) Provisional application No. 60/550,545, filed on Mar. 5, 2004.

(51) Int. Cl.
*H04B 10/00* (2006.01)
(52) U.S. Cl. .......... 398/136; 398/137; 398/154
(58) Field of Classification Search ......... 398/135–137, 398/154, 155
See application file for complete search history.

(56) References Cited

U.S. PATENT DOCUMENTS

| | | | |
|---|---|---|---|
| 5,822,749 A | 10/1998 | Agarwal | |
| 5,892,922 A | 4/1999 | Lorenz | |
| 5,978,952 A | 11/1999 | Hayek et al. | |
| 6,012,109 A | 1/2000 | Schultz | |
| 6,032,160 A | 2/2000 | Lehman | |
| 6,076,183 A | 6/2000 | Espie et al. | |
| 6,446,145 B1 | 9/2002 | Har et al. | |
| 6,535,743 B1 | 3/2003 | Kennedy | |
| 6,643,818 B1* | 11/2003 | Valk | 714/776 |
| 6,826,658 B1* | 11/2004 | Gaither et al. | 711/150 |
| 6,925,546 B2 | 8/2005 | Krejsa | |
| 6,981,125 B2 | 12/2005 | Emmes | |
| 6,983,355 B2 | 1/2006 | Ripberger | |
| 7,215,891 B1* | 5/2007 | Chiang et al. | 398/137 |
| 2002/0016942 A1 | 2/2002 | MacLaren et al. | |
| 2003/0097608 A1 | 5/2003 | Rodeheffer et al. | |
| 2003/0177319 A1 | 9/2003 | De Jong | |

(Continued)

OTHER PUBLICATIONS

U.S. Appl. No. 11/074,109, filed on Mar. 7, 2005 entitled "Byte-Configurable Memory in an Optical Transceiver."

(Continued)

*Primary Examiner*—Dalzid Singh
(74) *Attorney, Agent, or Firm*—Workman Nydegger

(57) ABSTRACT

A method that enables an optical transceiver to perform consistency checking, such as Cyclic Redundancy Checking (CRC), over internal information stored in the transceiver's memory while the transceiver is in operation. The optical transceiver includes a system memory and a consistency checker component. The consistency checker component determines that consistency checking is to be performed and identifies which portion of the system memory is to be checked. The consistency checker reads the portion of system memory and determines whether or not the portion of system memory is consistent with an expected consistency check value.

18 Claims, 4 Drawing Sheets

U.S. PATENT DOCUMENTS

| | | |
|---|---|---|
| 2003/0229765 A1 | 12/2003 | Suzuoki |
| 2004/0022537 A1 | 2/2004 | Mecherle et al. |
| 2004/0081424 A1 | 4/2004 | Moriwaki et al. |
| 2004/0136722 A1* | 7/2004 | Mahowald et al. .......... 398/138 |
| 2004/0162956 A1 | 8/2004 | Hidai et al. |
| 2006/0007905 A1 | 1/2006 | Yach et al. |
| 2006/0034612 A1* | 2/2006 | Yu et al. ..................... 398/135 |
| 2006/0147216 A1* | 7/2006 | Dybsetter et al. ........... 398/135 |
| 2007/0002773 A1* | 1/2007 | Wang et al. ................. 370/258 |
| 2007/0079185 A1 | 4/2007 | Totolos |

OTHER PUBLICATIONS

U.S. Appl. No. 11/073,827, filed on Mar. 7, 2005 entitled "Multi-Level Memory Access in an Optical Transceiver."
U.S. Appl. No. 11/073,827, filed Nov. 9, 2007, Office Action.
U.S. Appl. No. 11/073,827, filed Jun. 26, 2008, Office Action.
U.S. Appl. No. 11/073,827, filed Oct. 29, 2008, Office Action.
U.S. Appl. No. 11/074,109, filed Nov. 8, 2007, Office Action.
U.S. Appl. No. 11/074,109, filed Jun. 27, 2008, Office Action.
U.S. Appl. No. 11/320,034, filed Jul. 25, 2008, Office Action.

* cited by examiner

CONSISTENCY CHECKING OVER INTERNAL INFORMATION IN AN OPTICAL TRANSCEIVER

CROSS-REFERENCE TO RELATED APPLICATIONS

This application claims the benefit of U.S. Provisional Application No. 60/550,545, filed Mar. 5, 2004, which is incorporated herein by reference in its entirety.

BACKGROUND OF THE INVENTION

1. The Field of the Invention

The present invention relates generally to consistency checking. More specifically, the present invention relates to optical transceivers that perform consistency checking on information stored in internal memory.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier.

What would be advantageous is to improve the reliability of such a controller when operating to control the various features of the optical transceiver.

BRIEF SUMMARY OF THE INVENTION

The forgoing problems with the prior state of the art are overcome by the principles of the present invention, which relate to consistency checking in an optical transceiver. The optical transceiver includes a system memory with both consistency check portions (i.e., portions of system memory that are to be subjected to consistency checking) and non-consistency check portions (i.e., portions of system memory that are not to be subjected to consistency checking). The optical transceiver also includes a consistency checker component that is configured to perform consistency checking.

This improves the reliability of the optical transceiver since undesired changes in consistency checking portions of the system memory are detected. This also allows the flexibility of having portions of memory not be subjected to computationally intensive consistency checking procedures if those memory portions may be altered during the normal course of operation, or are less critical to the operation of the optical transceiver.

In accordance with the principles of the present invention, the optical transceiver determines that consistency checking is to be performed. The consistency checker component identifies portions of the system memory that are to be subjected to the consistency checking. This may be accomplished using a memory-check table that includes various entries that identify the location of the consistency check portions of the system memory. In this way, the consistency checker component may easily identify the consistency check portions of system memory even when the consistency check portions are interleaved with the non-consistency check portions of system memory.

After determining that consistency checking is to be performed, the consistency checker component reads the data stored in the identified memory locations. Finally, the consistency checker determines if the data from the consistency check memory locations is consistent with an expected value. Accordingly, the optical transceiver is able to perform consistency checking on its internally stored data, even when operating for long periods of time. This helps ensure that a long running transceiver will not continue to operate if the data in memory has become corrupt. If an error is found, the transceiver is able to internally take remedial action.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to a method that enables an optical transceiver to perform consistency checking, such as Cyclic Redundancy Checking (CRC), over internal information stored in the transceiver's memory while the transceiver is in operation. The optical transceiver includes a system memory and a consistency checker component. The consistency checker component determines that consistency checking is to be performed and identifies portion(s) of the system memory that are to be checked. For at least one or more of the consistency check portions, the consistency checker component reads the portion(s) of system memory and determines whether or not the portion(s) of system memory have a value that, when subjected to a many-to-one mapping function is consistent with an, expected consistency check value. For instance, the consistency checker component may perform CRC consistency checking.

An example operational optical transceiver environment will first be described. Then, the operation in accordance with the invention will be described with respect to the operational environment.

Figure 1:
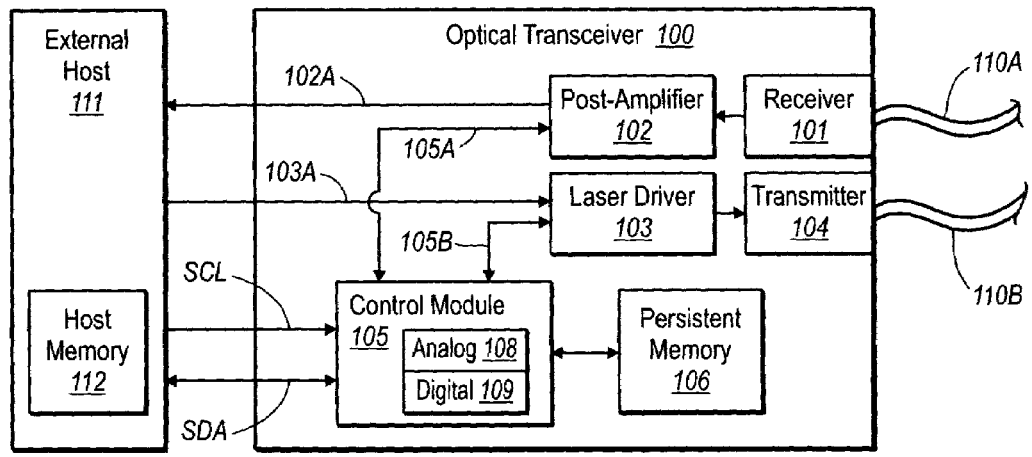
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 8G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant.

The control module 105 may have access to a persistent memory 106, which in one embodiment, is an Electrically Erasable and Programmable Read Only Memory (EE-PROM). Persistent memory 106 may also be any other non-volatile memory source.

Data and clock signals may be provided from the host 111 to the control module 105 using the serial clock line SCL, and the serial data line SDA. Also data may be provided from the control module 105 to the host 111 using serial data line SDA to allow for digital diagnostics and readings of temperature levels, transmit/receiver power levels, and the like.

Figure 2:
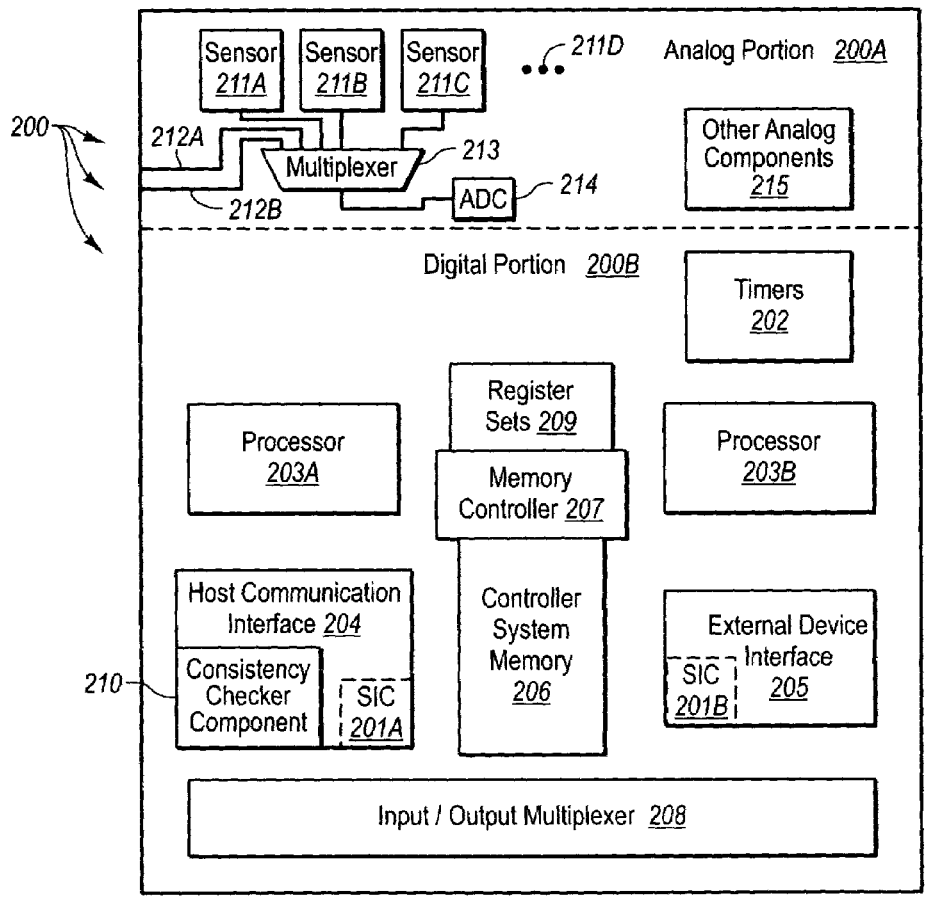
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111 using the serial data (SDA) and serial clock (SCL) lines of the optical transceiver 100. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I$^2$C or may be another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Register sets 209 contain a number of individual registers. These registers may be used by the processors 203 to write microcode generated data that controls high speed comparison in optical transceiver 100. Alternatively, the registers may hold data selecting operational parameters for comparison. Additionally, the registers may be memory mapped to the various components of optical transceiver 100 for controlling aspects of the component such as laser bias current or transmit power.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to an optical transceiver that is configured to perform consistency checking over internal information stored in the transceiver's memory while the transceiver is in operation. The principles of the present invention will be described with reference to the environment described in relation to FIGS. 1 and 2.

In order to perform consistency checking, it is necessary to implement a consistency checker component. In the claims and in the description, "consistency checker component" is defined as any hardware that is capable of reading a portion of memory (e.g., in response to executing microcode or in response to some other signal(s)) and determining whether or not the contents of the portion of memory are consistent with an expected value. This may include, but is not limited to, a specific consistency checker device, a state machine, or a general microprocessor.

Referring to FIG. 2, a host communication interface 204 is illustrated. In addition to the functionality described previously, host communication interface 204 may also contain a consistency checker component 210. However, the consistency checker component may also be implemented in other parts of transceiver 100.

Consistency checker component 210 performs consistency checking on portions of controller system memory 206. While controller system memory 206 may be RAM as previously described, it may also be a processor, a register, a flip-flop, non-volatile memory (such as persistent memory 106), or any other memory device. Controller system memory 206 includes both consistency check portions and non-consistency check portions.

In the description and in the claims "consistency check portion" is defined to as portions of memory that are to be subjected to consistency checking. Consistency checking for a specific memory location is defined as determining whether or not the actual value of the memory location is consistent with an expected value for that memory location. Such consistency check portions of memory may, for example, contain information that is more critical to the operation of the optical transceiver, and which generally does not change during the normal course of operation.

In the description and in the claims, "non-consistency check portion" is defined as those portions of memory that is not to be subjected to such consistency checking. Such consistency check portions of memory may, for example, contain information that is less critical to the operation of the optical transceiver, or which generally changes during the normal course of operation.

In some embodiments, the various portions of consistency check and non-consistency check memory are interleaved. In the description and in the claims "interleaved" when used to describe the consistency check and non-consistency check portions is defined to mean that there are at least two consistency check portions that are separated from each other by at least one non-consistency check portion.

The portions of consistency check memory may be different sizes or may even change location and size in response to changed operational circumstances in optical transceiver 100.

The consistency check portions may also define the operation of the optical transceiver. For example, the consistency check portions may contain microcode, that when executed by the processors 203, direct the operation of the optical transceiver.

Figure 3:
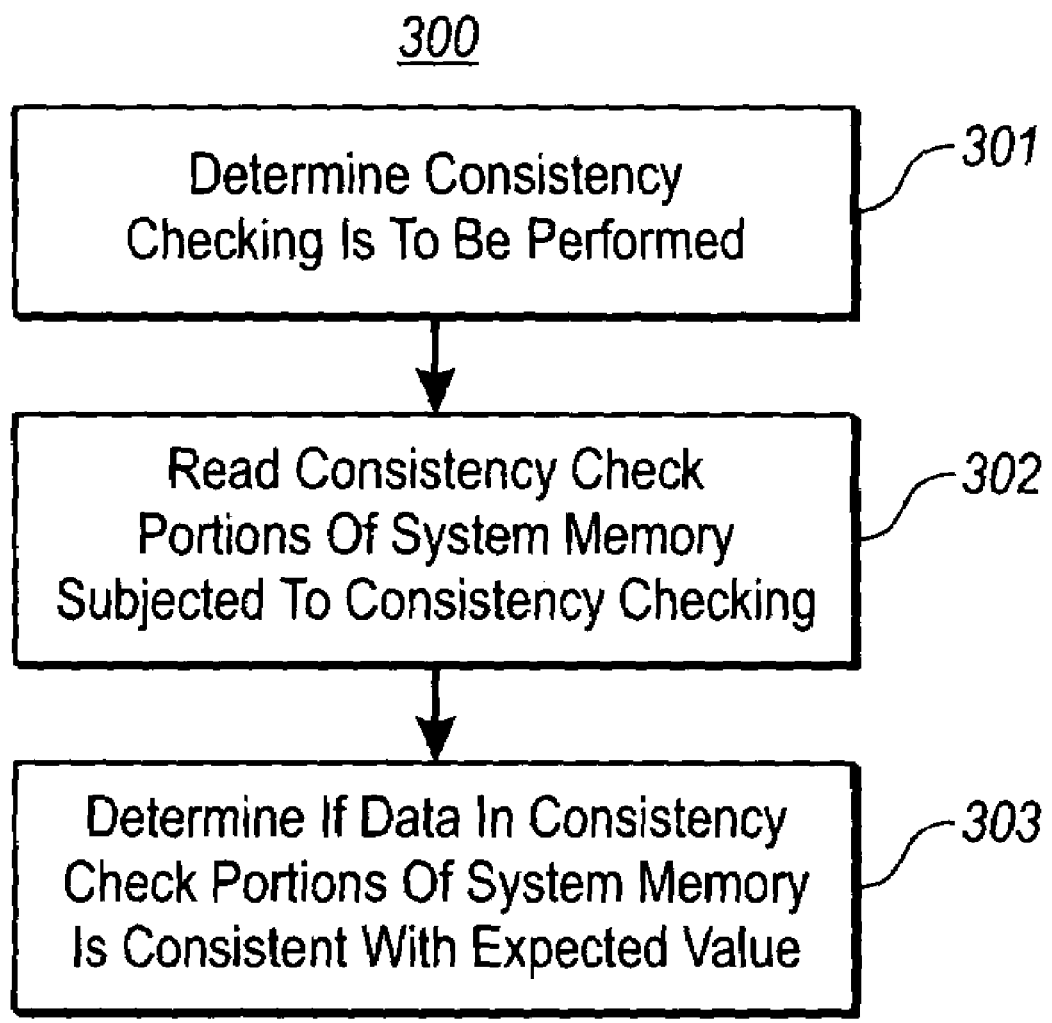
FIG. 3 illustrates a method for performing consistency checking in accordance with the principles of the present invention.

Referring to FIG. 3, a flowchart of a method 300 for an optical transceiver to perform consistency checking on consistency check portions of a system memory is illustrated. The method 300 may be performed by, for example, the consistency check component, although the performance of the method may be distributed throughout other components of the optical transceiver.

First, it is determined that consistency checking is to be performed on controller system memory 206 (act 301). Referring to FIG. 2, consistency checker component 210 identifies portions of controller system memory 206 that are to be subjected to consistency checking. In some embodiments, a register in register sets 209 or a portion of the system memory 206 contains a memory-check table that identifies the locations of the consistency check portions of memory to be checked. There may be other ways that consistency checker component 210 may identify the consistency check portions of system memory to consistency check.

Consistency checker component 210 then reads at least one of the one or more consistency check portions of system memory 206 that are to be subjected to consistency checking (act 302). The consistency check memory locations may be read all at one time or one or more locations at a time. In embodiments implementing a memory-check table, use of the memory-check table allows the consistency checker component to read the consistency check portions while bypassing any non-consistency check portions that may be interleaved between the consistency check portions.

Finally, the consistency checker component 210 estimates if the data from the consistency check portions of controller system memory 206 are consistent with an expected consistency check value (act 303). For example, in a CRC operation, consistency checker component 210 generates an actual consistency check value (e.g., a CRC checksum) by applying a CRC algorithm to the data read from the consistency check portion. The resulting CRC checksum is then compared against a known CRC checksum found in the memory-check table. If the values are not the same, the consistency checker component 210 may be alerted to the fact that an error or degradation of the controller system memory 206 has occurred and may take remedial action. If, on the other hand, the values are the same, then no error is indicated in the controller system memory 206.

In some embodiments, consistency checker component 210 will take remedial action upon estimating that the consistency check portions of controller system memory 206 are not an expected consistency check value. For example, consistency checker component 210 may report the error to host 111 using the serial data line SDA or other implemented host interface. Informing the host allows for transceiver 100 user analyses. In other embodiments, consistency checker component 210 may initiate a warm reboot process. In the description and in the claims, "warm reboot" is defined to mean loading data from a persistent memory source into system memory after an optical transceiver has been in operation for a period of time. A warm reboot allows correct data from persistent memory 106 to overwrite the error in controller system memory 206. Consistency checker component 210 may be configured to self-initiate the warm reboot process. Alternatively, consistency checker component 210 may report the error to processors 203, thus allowing the processors to initiate the reboot process. Additionally, host 111 may initiate the reboot process on receiving the error report from the consistency checker component 210. In this way, a long running optical transceiver is protected from memory degradation as the optical transceiver may initiate a warm reboot whenever a memory error is detected.

Figure 4:
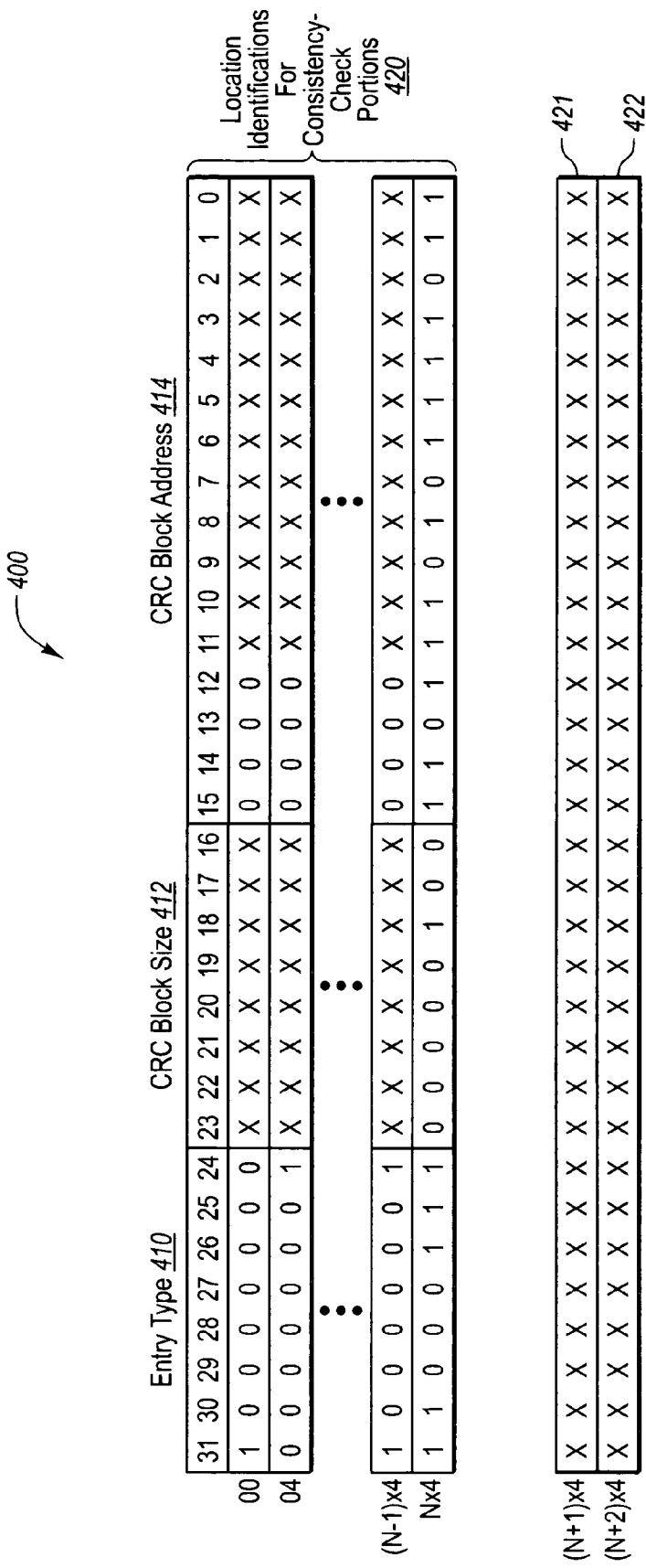
FIG. 4 illustrates a block diagram of a memory-check table in accordance with embodiments of the present invention.

Having described a general method for consistency checking to be performed on portions of system memory in an optical transceiver, specific embodiments of the acts illustrated in FIG. 3 will now be described. Some embodiments, as mentioned above, include a memory-check table that is used to determine the consistency check portions of controller system memory 206 that are to be subjected to consistency checking (act 301). Referring to FIG. 4, an example of a memory-check table is depicted. This example memory check table is by way of illustration only and is not to be read to limit the claims. There may be numerous other ways that one skilled in the art can configure a memory-check table to practice the principles of the present invention.

During the boot process (i.e., when the optical transceiver is first operational or during a warm reboot) consistency checker 210 accesses a memory-check table 400. The memory-check table 400 may be stored in either a portion of controller system memory 206 or in a register in register sets 209 and is loaded from persistent memory 106 or host 111. The memory-check table 400 includes location identifiers 420 that are schematically illustrates a number (N+1) of horizontal rows, each representing an entry that is four bytes long. Each entry in the location identifiers 420 identify a specific consistency check portion, and include an entry type field 410, a CRC block size field 412, and a CRC block address field 414. The location identifiers 420 may identify any positive integer number (including potentially just one) of consistency check portions.

The memory-check table also includes a row 421 that is used to store the actual consistency check value, for example a CRC checksum, which is calculated by a consistency check computation such as Cycle Redundancy Checking (CRC). In some embodiments, an additional entry in the table may contain the expected consistency check value or a pointer to another location in controller system memory 206 or register sets 209 containing the expected consistency check value. The purpose of row 422 will be described further below.

The entry type field 410 includes a one byte value that defines if the entry is the first entry in the field, or the last entry in the field, or whether the entry is to be skipped when doing consistency checking. The consistency checker evaluates the memory-check table 410 one entry at a time, top to bottom, until it finds an entry that is identified as being the last entry in the table. Referring to FIG. 4, the entry beginning with address 00 is the first entry, and the entry beginning with address N×4 (where N is some positive integer) is the last entry in the field.

The CRC block size 412 indicates the size of the particular consistency check portion of the memory referenced by the entry. The CRC block address 414 identifies the address of the consistency check portion of memory identified by the entry. Together, the size and beginning address of the consistency check portion uniquely define the actual location of the memory portion that is to be subjected to consistency checking.

As previously mentioned, the memory-check table 400 is used by consistency checker component 210 to identify the consistency check portions of system memory for consistency checking. Consistency checker component 210 reads the first entry in the memory-check table, which in FIG. 4 is entry 00. The use of the terms "first", "second", and so forth in the description and the claims to modify a memory-check table entry is not intended to represent any sequential, temporal or spatial ordering of the entries, but is used merely to distinguish one entry from another.

The consistency checker component identifies the memory location of the first entry and begins the consistency check process by processing the consistency check portion in a serialized manner using a many to one deterministic function. If the current consistency check portion is not the last entry, the consistency checker component reads the second entry in the memory-check table, which in FIG. 4 is entry 04. The consistency checker component identifies the memory location of the second entry and continues the consistency check by processing the second consistency check portion. This may be repeated for other identified consistency check portions as well. Each result of the many-to-one mapping function (e.g., the CRC checksum) is accumulated with the previous results from all prior entries to determine an actual, consistency check value which is used to compare with an expected consistency check value.

The final actual calculated consistency check value is then provided into the field 421. This final actual calculated value may be, for example, the CRC checksum for all or perhaps just a portion of the consistency check portions identified by the location identifies 420. The consistency checker component 210 accesses the memory-check table 400 or another memory location such as a register to determine the expected consistency check value. The consistency checker component 210 compares the actual consistency check value and the expected consistency check value and determines if there are any errors in the system memory. As mentioned previously, if the actual consistency check value is consistent with the expected consistency check value (i.e., the values are the same), then there are no detected errors in the system memory.

In other embodiments, it may be desirable to add data to the memory-check table after the boot process is complete to enable consistency checking of additional blocks of consistency check memory. During the boot process, entries of the memory-check table are populated with data defining the consistency check portions of controller system memory 206. However, one or more entries of the memory-check table may not be populated. Instead, these entries are temporarily left unpopulated. Such unpopulated entries may be identified as such in, for example, the corresponding entry type field 410. This prompts the consistency checking component 210 to skip that entry when calculating the consistency check value. For example, referring to FIG. 4, entry 00 may be populated with location and size data while entry 04 is temporarily left unpopulated.

While determining that a consistency check is to be performed, consistency checker component 210 uses the memory-check table 400 to identify the portions of consistency check memory for consistency checking as described. Consistency checker component 210 reads the first entry in the memory-check table, which in FIG. 4 is entry 00. The consistency checker component identifies the memory location of the first entry and processes the data as described previously. If there is no flag data indicating this is the last entry, the consistency checker component 210 moves on to the second entry in the memory-check table, which in FIG. 4 is entry 04. However, if the entry 04 is unpopulated, the consistency checker component 210 would read a flag indicating this in the entry type field 410. In FIG. 4, the unpopulated flag is depicted by a "1" in bit 24 in the entry type field 410. On reading this skip flag, the consistency checker component skips this entry and goes on to read the next populated entry, and so on for each subsequent entry.

At a later time, it may become desirable to perform consistency checking on additional consistency check portions of controller system memory 206. The processors 203, host 111, or the consistency checker component 210 itself may access the memory-check table and populate any temporarily unpopulated entries with data defining the additional portions of consistency check memory that are to be subjected to consistency checking. For example, if entry 04 of FIG. 4 had been left unpopulated as previously described, then entry 04 would have location and size data written to it, and the data type field 410 would be altered to indicate that the entry is not to be skipped, thereby prompting the consistency checker component to process the entry 04. A new consistency check value would then be regenerated for comparison as will be described below.

In other embodiments, there may be occasions when the data in a consistency check portion of controller system memory 206 may become altered. The change in the portion of memory is accommodated by regenerating the consistency checking value. If there is no regeneration, then consistency checker 210 cannot perform a valid consistency check since the purpose of the consistency checking is to ensure that no changes have occurred in the memory portions subjected to consistency checking.

A memory-check table may be configured to contain data defining the consistency check portions of the controller system memory 206. This memory-check table may act in accordance with memory-check table 400 of FIG. 4 discussed previously. Consistency checker 210 will access this table and read the entries as previously described. As mentioned above, if the data from the consistency check portions of system memory are subjected to a many to one deterministic function, then a consistency check value will be calculated that matches an expected consistency check value when there is no degradation of the system memory. This new consistency check value may be written to field 422. The regenerated value will be used in later consistency checking.

Figure 5:
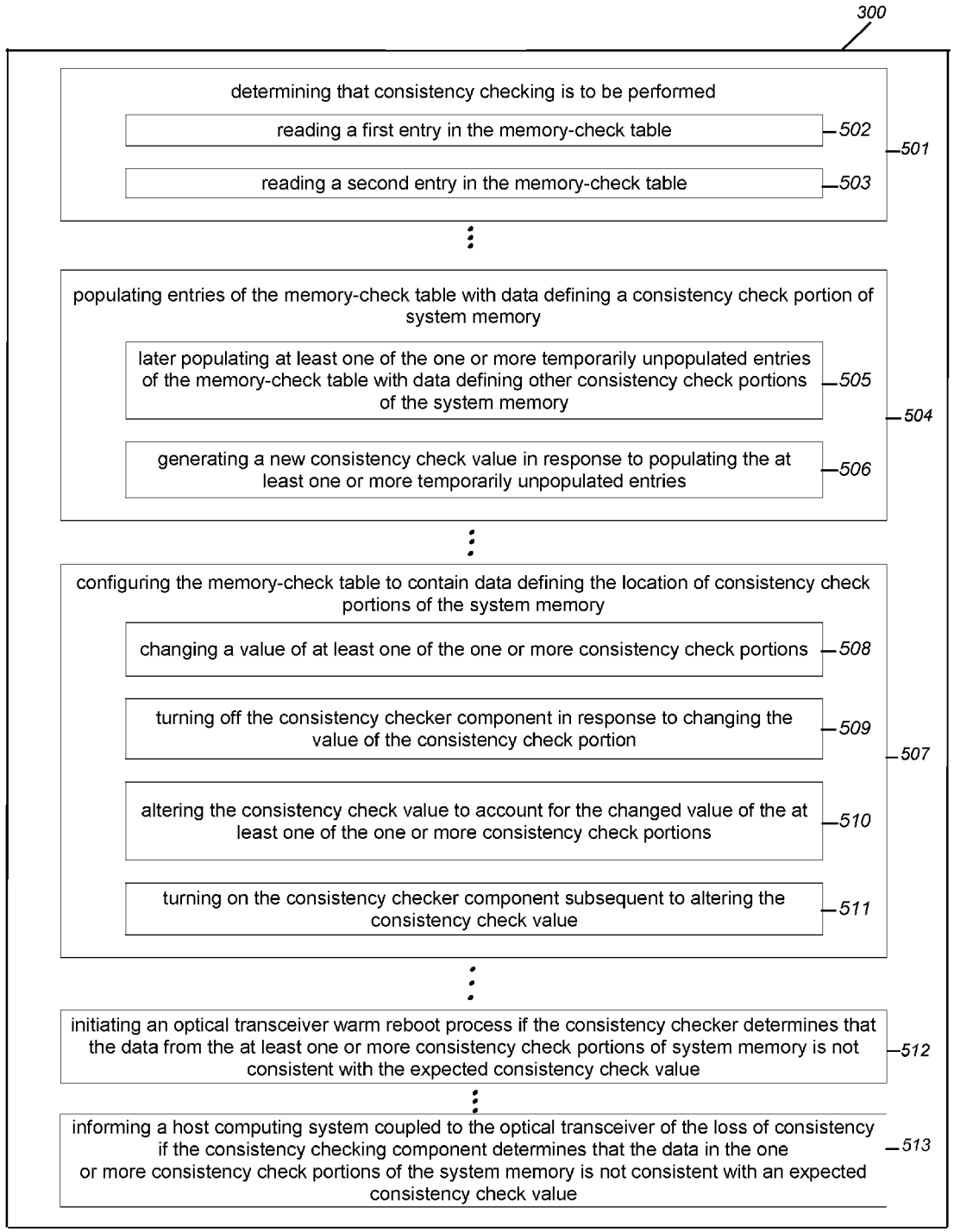
FIG. 5 further illustrates aspects of performing consistency checking in accordance with embodiments of the invention.

FIG. 5 illustrates additional features of the method 300 to perform consistency checking on consistency check portions of a system memory. Determining 501 that consistency checking is to be performed may include reading 502 a first entry and/or reading 503 a second entry in a memory-check table. Populating 504 entries of the memory check table can include populating 505 temporarily unpopulated entries with data defining other consistency check portions of the system memory. It can include generating 506 a new consistency check value in response to populating the temporarily unpopulated entries. Configuring 507 the memory-check table can include changing 508 a value of at least one of the consistency check portions, turning 509 off the consistency checker component, altering 510 the consistency check value to account for the changed value, or turning 5111 on the consistency checker component subsequent to altering the consistency check value. Remedial actions can include initiating 512 an optical transceiver warm boot process or informing 513 a host system of the loss of consistency.

As mentioned previously, the system memory may be divided into consistency check portions and non-consistency check portions. Logically, the consistency check portions must be static data areas where the data stored does not change. This data may include microcode instructions that control the operation of the optical transceiver. The non-consistency check portions, however, are dynamic data areas in that the data that is written to the dynamic areas can change without effecting the consistency checking.

In some embodiments, it may be desirable to configure the memory to have a dynamic data area bounded on both sides by a static data area. This may help prevent corruption of the system memory. For example, there may be times when the dynamic data area becomes unexpectedly full and new data is written in a static data area on either side of the dynamic area. During consistency checking in accordance with the principles of the present invention, the consistency checker component will determine that the actual consistency check value is not the same as the expected consistency check value due to the new data that has been written into the static area. This may prompt the consistency checker component to initiate a warm reboot process for the optical transceiver. Bounding the dynamic data area with static data areas helps ensure that the optical transceiver is protected from having data written to the static data areas, such as those areas containing executable microcode, that may cause damage to the optical transceiver.

Accordingly, the principles of the present invention relate to performing consistency checking on internal information in an optical transceiver. This allows for consistency checking during the operation of the optical transceiver. Consistency errors may be caught and reported to the host. Alternatively, the transceiver may initiate a warm reboot or perform any other action that will be advantageous upon detecting the error. This helps to prevent the execution of corrupt data and helps to prevent damage to the optical transceiver. This is especially useful for an optical transceiver that has been in operation for a long period of time. Accordingly, the principles of the present invention are a significant advancement in the art of consistency checking in optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optical transceiver system including system memory and a consistency checker component, the system memory including a plurality of consistency check portions that are to be subjected to consistency checking and plurality of non-consistency check portions that are not to be subjected to consistency checking, wherein the plurality of non-consistency check portions are interleaved between the plurality of consistency check portions, a method for the consistency checker component to check portions of system memory for consistency, the method comprising:

during operation of an optical transceiver system, performing:

an act of determining that consistency checking is to be performed on one or more consistency check portions of the system memory;

an act of the consistency checker component reading at least one of the one or more consistency check portions of the system memory that are to be subjected to consistency checking; and an act of the consistency checker component determining whether or not the data from the at least one of the one or more consistency check portions of system memory is consistent with an expected consistency check value.

2. A method in accordance with claim 1, wherein the system memory further has thereon a memory-check table, and the act of determining that consistency checking is to be performed on one or more consistency check portions of the system memory further comprises:

an act of reading a first entry in the memory-check table, the first entry identifying a first consistency check portion of the system memory; and an act of reading a second entry in the memory-check table, the second entry identifying a second consistency check portion of the system memory.

3. A method in accordance with claim 1, wherein the system memory further has thereon a memory-check table, further comprising:

an act of populating entries of the memory-check table with data defining a consistency check portion of system memory identified by the entries while leaving one or more entries of the memory-check table temporarily unpopulated;

an act of later populating at least one of the one or more temporarily unpopulated entries of the memory-check table with data defining other consistency check portions of the system memory; and an act of generating a new consistency check value in response to populating the at least one or more temporarily unpopulated entries.

4. A method in accordance with claim 1, wherein the system memory further has thereon a memory-check table, the optical transceiver further includes a processor, the method further comprising:

an act of configuring the memory-check table to contain data defining the location of consistency check portions of the system memory, wherein a consistency check value is associated with one or more of the consistency check portions of the system memory such that when the data from the one or more consistency check portions of the system memory is provided as input to a many to one deterministic function, the consistency check value should result;

an act of the processor changing a value of at least one of the one or more consistency check portions;

an act of the processor turning off the consistency checker component in response to the act the processor changing the value of the consistency check portion;

an act of the processor altering the consistency check value to account for the changed value of the at least one of the one or more consistency check portions; and an act of turning on the consistency checker component subsequent to the act of the processor altering the consistency check value.

5. A method in accordance with claim 1, further comprising:

an act of the consistency checker component initiating an optical transceiver warm reboot process if the consistency checker determines that the data from the at least one or more consistency check portions of system memory is not consistent with the expected consistency check value.

6. A method in accordance with claim 1, wherein at least one of the one or more consistency check portions define an operation of an optical transceiver.

7. A method in accordance with claim 1, wherein the consistency checker component is a state machine.

8. A method in accordance with claim 1, wherein the consistency checker component is a processor.

9. A method in accordance with claim 1, wherein a dynamic data area of system memory is bounded on both sides by static data areas of system memory.

10. An optical transceiver comprising:

a system memory, the system memory including a plurality of consistency check portions that are to be subjected to consistency checking and plurality of non-consistency check portions that are not to be subjected to consistency checking, wherein the plurality of non-consistency check portions are interleaved between the plurality of consistency check portions;

a consistency checker component for performing consistency checking on one or more of the consistency check portions of system memory, wherein the consistency checking comprises, during operation of the optical transceiver:

determining that consistency checking is to be performed on one or more consistency check portions of the system memory;

reading at least one of the one or more consistency check portions of the system memory that are to be subjected to consistency checking; and determining whether or not the data from the at least one of the one or more consistency check portions of system memory is consistent with an expected consistency check value.

11. An optical transceiver in accordance with claim 10, wherein the system memory further has thereon a memory-check table and the consistency checking further comprises:

reading a first entry in the memory-check table, the first entry identifying a first consistency check portion of the system memory; and reading a second entry in the memory-check table, the second entry identifying a second consistency check portion of the system memory.

12. An optical transceiver in accordance with claim 10, wherein the system memory further has thereon a memory-check table and the consistency checking further comprises:

populating entries of the memory-check table with data defining a consistency check portion of system memory identified by the entries while leaving one or more entries of the memory-check table temporarily unpopulated;

later populating at least one of the one or more temporarily unpopulated entries of the memory-check table with data defining other consistency check portions of the system memory; and generating a new consistency check value in response to populating the at least one or more temporarily unpopulated entries.

13. An optical transceiver in accordance with claim 10, wherein the system memory further has thereon a memory-check table, and the optical transceiver further includes a processor, the consistency checking further comprising:

configuring the memory-check table to contain data defining the location of consistency check portions of the system memory, wherein a consistency check value is associated with one or more of the consistency check portions of the system memory such that when the data from the one or more consistency check portions of the system memory is provided as input to a many to one deterministic function, the consistency check value should result;

the processor changing a value of at least one of the one or more consistency check portions;

the processor turning off the consistency checker component in response to the act the processor changing the value of the consistency check portion;

the processor altering the consistency check value to account for the changed value of the at least one of the one or more consistency check portions; and turning on the consistency checker component subsequent to the act of the processor altering the consistency check value.

14. An optical transceiver in accordance with claim 10, wherein the consistency checker component is configured to initiate an optical transceiver warm reboot process if the consistency checking component determines that the data in the one or more consistency check portions of the system memory is not consistent with an expected consistency check value.

15. An optical transceiver in accordance with claim 10, wherein the consistency checker component is configured to inform a host computing system coupled to the optical transceiver of the loss of consistency if the consistency checking component determines that the data in the one or more consistency check portions of the system memory is not consistent with an expected consistency check value.

16. An optical transceiver in accordance with claim 10, wherein at least one of the one or more consistency check portions define an operation of an optical transceiver.

17. An optical transceiver in accordance with claim 10, wherein the consistency checker component is a state machine.

18. An optical transceiver in accordance claim 10, a dynamic data area of system memory is bounded on both sides by static data areas of system memory.

* * * * *

UNITED STATES PATENT AND TRADEMARK OFFICE
CERTIFICATE OF CORRECTION

PATENT NO. : 7,657,186 B2
APPLICATION NO. : 11/073886
DATED : February 2, 2010
INVENTOR(S) : Dybesetter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 939 days.

Signed and Sealed this

Thirtieth Day of November, 2010

David J. Kappos
*Director of the United States Patent and Trademark Office*